Figure 1:
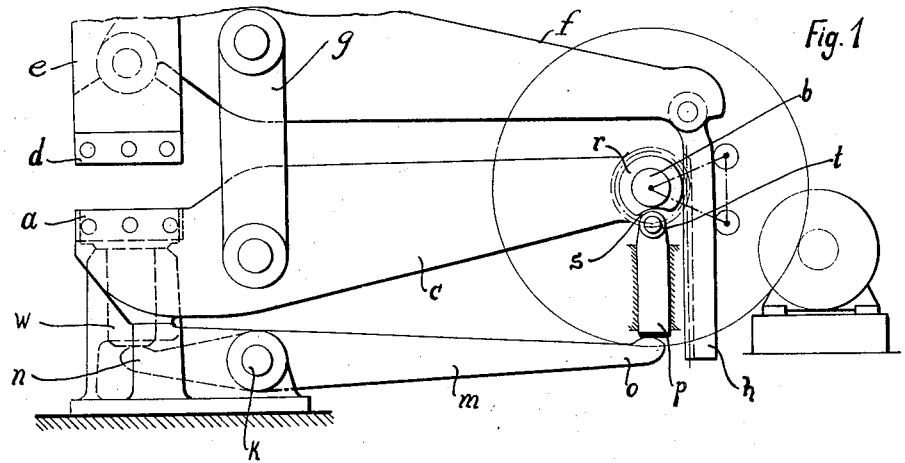

May 22, 1934.   K. SCHORN   1,960,125
SHEARING MACHINE
Filed March 3, 1932   2 Sheets-Sheet 1

Inventor
Karl Schorn
by N. Goepel
his attorney

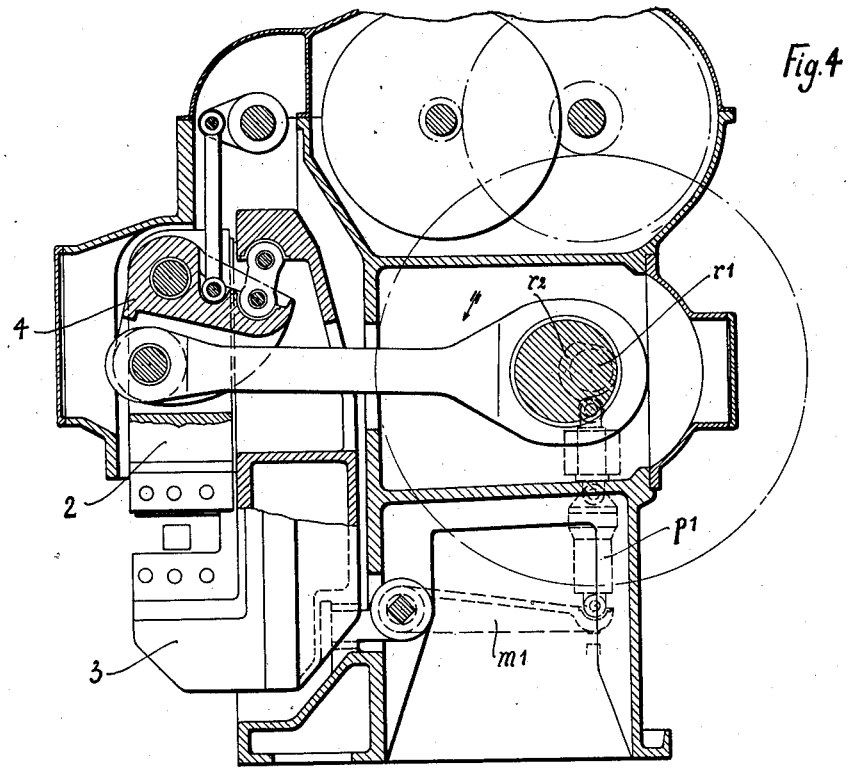
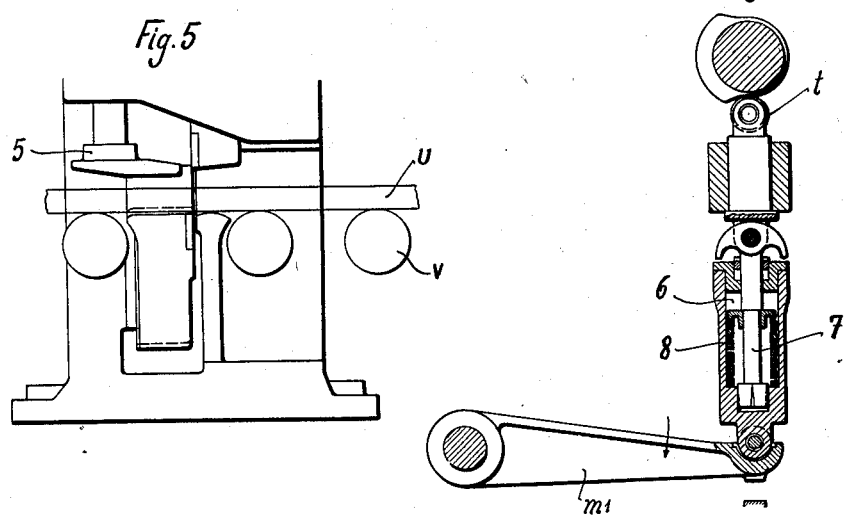

Patented May 22, 1934

1,960,125

UNITED STATES PATENT OFFICE 1,960,125

SHEARING MACHINE

Karl Schorn, Dusseldorf-Rath, Germany

Application March 3, 1932, Serial No. 596,530
In Germany December 5, 1931

11 Claims. (Cl. 164—47)

In shearing machines with two movable shear blades ordinarily used in connection with rolling mills there is the drawback that during the operation of shearing a pressure is exerted upon the work-piece, while being positioned on the roller track of the rolling mill. The pressure so exerted on the work-piece does not only impose excessive strains on the roller track and its bearings—which for this reason must be made rather large and heavy—but in case of a permanently operating roller track also acts excessively on those rollers which are positioned in the front and in the rear of the shearing machine in a manner to effect considerable braking of said rollers. By this the wear and tear of the roller track as well as of the drive thereof is considerably increased and eventually also excessive loads are put on the motor drive which may eventually be a source of operating troubles.

According to my invention the aforementioned drawbacks and disadvantages which are inherent to shearing machines of the ordinary construction are successfully avoided by automatically lifting the work-piece from the roller track by means of the stripper or the slide for the top shear-blade prior to exposing said work-piece to the action of the shears. Moreover, this lifting of the work-piece is automatically effected according to my invention, whenever said work-piece is subjected to the action of the shear-blades, and in a manner to transpose the pressure which ordinarily acts upon the rollers onto the lifting mechanism and to prevent said pressure against acting upon the roller track. The lifting mechanism may consist of a special lifting or supporting member or also the slide of the bottom shear-blade may be used for this purpose, said slide being raised at the beginning of each shearing operation.

If a work-piece rests freely upon the rollers prior to being acted upon by the shear-blades, the driving mechanism at the beginning of each operation of shearing will at first lift said work-piece so far that it will be out of contact with the rollers and thereupon the slide of the top shear-blade, or as the case may be, the stripper is set onto said work-piece and the operation of shearing carried out. To carry out the operation of shearing either the carrier of the top shear-blade or, as the case may be, the carrier of the bottom shear-blade is operated in any of the well-known ways.

Lifting of the work-piece according to my invention may be accomplished by the aid of various devices. For instance, a lever mechanism may be used which is controlled by the driving shaft of the shearing machine or also some other device which may be operated by mechanical means, by electricity or by a pressure agent, said device being likewise controlled by said driving shaft. Preferably a buffer or shock absorbing device is used in connection with any of the aforementioned lifting devices, in order to avoid undesirable shocks during operation of the machine. According to my invention preferably a piston with a pressure liquid therein, for instance, an oil cataract brake, may be used with or without a buffer of the form of a spring. As compared with a buffer of the form of a spring, a brake of this kind offers the advantage that it does not exert any counter-shocks and that it always permits lowering of the bottom shear-blade as far as to the undermost end position. A buffer of this kind may also be used independently to absorb the shock which is exerted during placing the slide of the bottom shear-blade into operating position. If a spring or springs are used as buffers, there is the disadvantage that the counter-pressure exerted by the buffer becomes excessive and eventually prevents the shear-blade against moving into its under end position. This will always be the case, when using springs which are properly dimensioned to effectively take up the heaviest shocks arising with a large stroke of the shear-blades. This drawback is successfully avoided according to my invention by using an oil cataract brake, as had above been mentioned.

Figure 2:
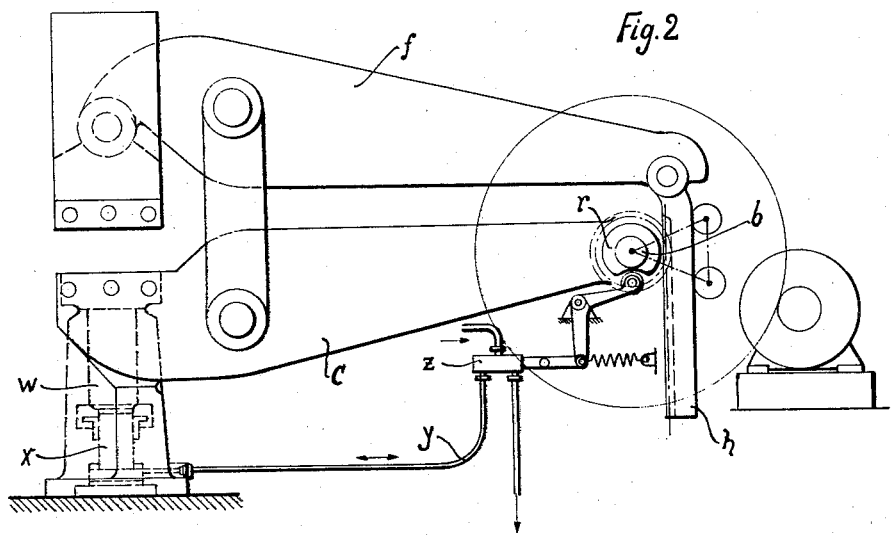
Figure 3:
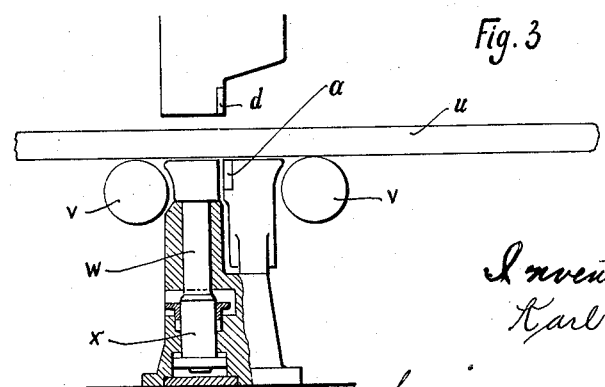

In the accompanying drawings, I have shown some examples of construction for my present shearing machine, Fig. 1 being a diagrammatical side-view of my new shearing machine comprising two swingable carriers for the shear-blades and a special lifting mechanism for automatically lifting the work-piece prior to each operation of shearing, Fig. 2 a side-view, similar to Fig. 1, showing a modified shearing machine including a special hydraulically operated lifting device for the work-piece, Fig. 3 a front-view, partly in section, on Fig. 2, Fig. 4 a further modified shearing machine with upwardly and downwardly sliding carriers for the shear-blades, including a lifting device which operates on the carrier for the bottom shear-blade, Fig. 5 a front-view taken on Fig. 4, and Fig. 6 an enlarged detail view showing the lifting device which forms part of Fig. 4.

In the construction of the machine shown in Fig. 1 the bottom shear-blade $a$ is immediately connected to a lever c which is mounted swingably around the driving shaft b, while the top shear-blade d is mounted on a slide e pivoted to a swinging lever f. The two levers c and f are connected with each other by a rod g pivoted at either end thereof to one of said levers. A rack h is pivoted to the right-hand end of the lever f and serves for operating the shearing machine, a gear-wheel on the driving shaft b engaging with said rack. In this construction of shearing machine first the top shear-blade d is set onto the work-piece and thereupon the lever c which carries the bottom shear-blade a is raised by means of the connecting rod g. According to Fig. 1 the aforementioned lifting mechanism for the work-piece consists of a double-armed lever m fulcrumed as, shown, at k to the frame of the machine at some place underneath the lever c which carries the bottom shear-blade a, an actuating member p controlled by a cam r fast on the driving shaft b serving to operate the lifting mechanism by exerting a downward pressure upon the end o of said lever m. The double-armed lever m upon being depressed by the member p acts on the lifting member w underneath the bottom shear-blade a. The cam r is provided with a recess s with which the roller t on the actuating member p co-operates, when the shearing machine is in condition of rest. The lifting member w in this condition of the machine will be positioned sufficiently low to permit the work-piece u to rest upon the rollers v which form part of the roller track of the machine. At the beginning of each operation of shearing the roller t on the actuating member p is forced out of the recess s in the cam r so that said roller will ride upon the periphery of the cam r during almost the entire revolution thereof. The actuating member p in operating condition of the machine is kept in depressed condition together with the double-armed lever m at the end o thereof, while at the same time the lifting member w is raised by the end n of the lever m so far that the work-piece will be out of contact with the rollers v and rest upon said lifting member. Further operation of the shearing machine is the same as in known constructions, that is the top shear-blade is set onto the work-piece and thereupon the carrier for the bottom shear-blade is drawn upward. By my invention, therefore, any strain due to the shearing pressure will be prevented from being imposed upon the rollers and eventually upon the stripper when placing the slide of the top shear-blade into operating position.

According to Fig. 2 the mechanism which serves for lifting the work-piece during the operation of shearing from the rollers is operated by hydraulic means. In this case the lifting member w instead of being acted upon by the double-armed lever m forming part of the construction shown in Fig. 1 is acted upon by a pressure liquid piston x. The pressure liquid conduit y which leads into the cylinder containing said piston includes a control organ z which is again operated by the driving shaft b of the shearing machine, for instance, by the aid of the cam r on said driving shaft.

In Figs. 4, 5 and 6 there is shown a shearing machine of ordinary construction including as a novel feature slides 2 and 3 for the top and bottom shear-blades, said slides being mounted to permit raising and lowering of the same, a bell-crank 4 serving for this purpose. According to Fig. 4 the driving shaft of the shearing machine carries a cam $r^1$ which effects lifting of the lever carrying the bottom shear-blade by means of an actuating member $p^1$ and a double-armed lever $m^1$. In the present case also the slide which carries the bottom shear-blade is in its undermost position so that the work-piece u rests upon the roller v when the shearing machine is in position of rest. However, as soon as the cam $r^2$ acts upon the roller t on the actuating member $p^1$ the lever $m^1$ is depressed at the right-hand end thereof and the slide 3 which carries the bottom shear-blade is raised sufficiently far to lift the work-piece out of contact with the rollers v. From the undermost position of the slide 3 the operation of shearing is carried out, that is to say, at first the stripper 5 and the slide 2 of the top shear-blade are set onto the work-piece u and thereupon the slide 3 of the bottom shear-blade is pulled upward.

In the construction shown in Fig. 4 a buffer is inserted into the lever mechanism which serves for lifting the work-piece out of contact with the rollers v, said buffer consisting of an oil cataract cylinder 6, as shown in the enlarged detail view of Fig. 6. The oil within the cylinder 6 is pressed through a bore in the well-known manner upon motion of the piston 7. A spring 8 serves solely to carry the buffer back into its initial position. The buffer shown in Fig. 6 serves to prevent especially those shocks which may arise when the slide for the bottom shear-blade is set into operation on the work-piece. More particularly, the buffer or shock absorber shown in Fig. 6 operates at each velocity of the shears and irrespective of the stroke of the shear-blades and will always carry the slide for the bottom shear-blade back into its undermost end position without exertion of shocks.

I claim:

1. A shearing machine comprising, a roller track for a workpiece, a top and bottom shear blade, lifting means adjacent said bottom blade, a driving shaft for the shear-blades, and a cam fast on said driving shaft, said lifting means having the form of a lever mechanism controlled by said cam, said lever mechanism being adapted to lift the work-piece from the roller-track prior to each operation of shearing, said lever mechanism including a buffer adapted to absorb shocks which may arise within said mechanism during being operated by said cam.

2. A shearing machine comprising a top and a bottom shear blade, a support for a workpiece, disposed beneath one of the blades, a lifting device of the form of a pressure-liquid brake, a driving mechanism for the shear-blades, pressure-liquid conduits associated with said brake, and control organs co-operative with said driving mechanism for operating said pressure liquid brake.

3. A shearing machine comprising a roller track for a work-piece, a top and bottom shear blade, lifting means adjacent said bottom blade, two swingably mounted carriers for the shear-blades, a driving shaft for said shear-blades, a cam fast on said driving shaft, a lever co-operative with said cam, said lever adapted to lift said carrier for the bottom shear-blade thus to release the work-piece during operation of shearing.

4. A shearing machine comprising a top and a bottom shear blade, a support for a workpiece, disposed beneath one of the blades, a lifting device of the form of a slide for each of the shear-blades, means for raising and lowering said slides, and a pressure-liquid brake to act as a buffer for the slide of the bottom shear-blade.

5. A shearing machine comprising a roller track for a workpiece, a top and bottom shear blade, lifting means adjacent said bottom blade, a driving means for the shear-blades, slides as carriers for said shear-blades, means for mounting said slides to permit raising and lowering thereof, said machine having a lifting device of the form of a double-armed lever, permitting one end of said lever to act as a support for the slide of the bottom shear-blade, and a control organ co-operative with said driving means, said control organ adapted to operate the other end of said lever, thereby lifting said slide for said bottom shear-blade, and a buffer interposed between said lever and said control organ.

6. A shearing machine comprising a top and a bottom shear blade, a foundation support disposed near one of the blades for a workpiece, and a lifting device separate from the blades actuable upon movement of one of the blades for lifting said workpiece from said support.

7. A shearing machine comprising a roller track for a workpiece, a top and a bottom shear blade, and a lifting device mounted movably adjacent and actuable by said bottom shear blade, said lifting device upon actuation being adapted with the lower blade to lift said workpiece from said roller track.

8. A shearing machine comprising a top and bottom shear blade, a support for a workpiece, a vertically movable carrier for lifting the workpiece from the support, upon operation of the lower blade, and means for lifting said carrier.

9. A shearing machine comprising a top and a bottom shear blade, a support for a workpiece, a vertically movable carrier for lifting the workpiece from the support upon operation of the lower blade, means for actuating the shear blades, and control means in connection with the bottom blade cooperative with the actuating means for raising the support prior to each operation of shearing.

10. A shearing machine comprising a roller track for a workpiece, a top and a bottom shear blade, lifting means actuable by the bottom shear blade, a drive shaft for the blades, a cam on said shaft for controlling the movement of the bottom shear blade, and lifting means in connection with and actuable by said cam, said lifting means being adapted to raise the workpiece from the roller track in conjunction with the bottom shear blade and prior to each operation of shearing.

11. In a shearing machine comprising coactive upper and lower shear blades, the combination therewith of supporting means for a workpiece normally in the same horizontal plane as the lower blade, means for raising the work-piece to free its weight from the blades upon the coaction of the shear blades, and means cooperating with the shear blades and workpiece for actuating said shear blades against the workpiece after its elevation.

KARL SCHORN.